US011212645B2

(12) United States Patent
Millius et al.

(10) Patent No.: US 11,212,645 B2
(45) Date of Patent: Dec. 28, 2021

(54) APPARATUS AND METHOD FOR ASSIGNING RESOURCES TO PERSONS WITHIN A FACILITY

(71) Applicants: Peter Millius, Atlantic Beach, NY (US); James A. White, Voorschoten (NL)

(72) Inventors: Peter Millius, Atlantic Beach, NY (US); James A. White, Voorschoten (NL)

(73) Assignee: INNOVET, LLC, Dover, DE (US)

( * ) Notice: Subject to any disclaimer, the term of this patent is extended or adjusted under 35 U.S.C. 154(b) by 0 days.

(21) Appl. No.: 17/083,514

(22) Filed: Oct. 29, 2020

(65) Prior Publication Data
US 2021/0044925 A1 Feb. 11, 2021

Related U.S. Application Data

(63) Continuation-in-part of application No. 17/039,170, filed on Sep. 30, 2020, which is a continuation of
(Continued)

(51) Int. Cl.
*H04W 4/33* (2018.01)
*H04W 4/02* (2018.01)
(Continued)

(52) U.S. Cl.
CPC .......... *H04W 4/023* (2013.01); *G06K 7/1417* (2013.01); *G08B 21/02* (2013.01); *H04W 4/029* (2018.02); *H04W 4/33* (2018.02); *H04W 4/80* (2018.02)

(58) Field of Classification Search
CPC ......... H04W 4/33; H04W 4/029; H04W 4/80; G06K 7/1417; G08B 21/02; G01C 21/206;
(Continued)

(56) References Cited

U.S. PATENT DOCUMENTS

| 6,727,818 B1 | 4/2004 | Wildman |
|---|---|---|
| 7,015,816 B2 | 3/2006 | Wildman |
| | (Continued) | |

FOREIGN PATENT DOCUMENTS

CN   103473574 A   12/2013

OTHER PUBLICATIONS

Notice of Allowance for U.S. Appl. No. 16/894,030, dated Jul. 29, 2020, 33 Pages.

*Primary Examiner* — Dai Phuong
(74) *Attorney, Agent, or Firm* — Maine Cernota & Rardin

(57) ABSTRACT

A method of minimizing cross-contamination of pathogens between persons within a facility includes placing tags onto shared resources such as tables, desks, chairs, coffee makers, microwave ovens, sinks, bathroom stalls, etc. A mobile device senses the tags and approximates their locations, in embodiments relative to tagged anchor points. The mobile device can include any combination of tag-sensing and locating features, including a camera, LIDAR, GPS, sonic distance measurement, and accelerometers for inertial position sensing. In embodiments, the approximated tag locations can be verified and corrected as needed by using augmented reality to project the estimated tag locations onto the actual scene. The accurately determined tag locations are then used to assign resources to persons within the facility, whereby spatial distancing between persons and time intervals between usage of the same resource are maximized. A log of the resource assignments can be used to enhance contact tracing.

21 Claims, 14 Drawing Sheets

Related U.S. Application Data application No. 16/894,030, filed on Jun. 5, 2020, now Pat. No. 10,841,737, application No. 17/083,514, which is a continuation-in-part of application No. 16/894,030, filed on Jun. 5, 2020, now Pat. No. 10,841,737.

(51) Int. Cl.
*H04W 4/80* (2018.01)
*G06K 7/14* (2006.01)
*G08B 21/02* (2006.01)
*H04W 4/029* (2018.01)

(58) Field of Classification Search
CPC .. G06T 7/248; G06T 7/74; G06T 7/60; G06T 19/006; G06T 2219/004; G06T 2207/10028; G01S 19/48
See application file for complete search history.

(56) References Cited

U.S. PATENT DOCUMENTS

| | | |
|---|---|---|
| 7,242,306 B2 | 7/2007 | Wildman |
| 7,423,533 B1 | 9/2008 | LeBlond |
| 8,294,584 B2 | 10/2012 | Plost |
| 8,368,544 B2 | 2/2013 | Wildman |
| 8,502,681 B2 | 8/2013 | Bolling |
| 9,147,334 B2 | 9/2015 | Long |
| 9,497,428 B2 | 11/2016 | Gaisser |
| 9,609,003 B1 | 3/2017 | Chmielewski |
| 9,613,518 B2 | 4/2017 | Dunn |
| 9,715,817 B2 | 7/2017 | Wildman |
| 9,773,402 B2 | 9/2017 | Raichman |
| 9,773,403 B2 | 9/2017 | Morgan |
| 10,002,518 B1 | 6/2018 | Wheeler |
| 10,643,446 B2 | 5/2020 | Kusens |
| 2007/0190922 A1 | 8/2007 | Fuchs |
| 2009/0091458 A1 | 4/2009 | Deutsch |
| 2011/0121974 A1 | 5/2011 | Tenarvitz |
| 2012/0171077 A1 | 7/2012 | Bridges, III |
| 2013/0187775 A1 | 7/2013 | Marsden et al. |
| 2014/0073300 A1* | 3/2014 | Leeder .............. H04M 3/42348 455/416 |
| 2014/0180713 A1 | 6/2014 | Tenarvitz |
| 2014/0344953 A1 | 11/2014 | Roundtree |
| 2016/0088667 A1* | 3/2016 | Tomita .................... H04W 4/80 370/338 |
| 2017/0173200 A1 | 6/2017 | Wyman |
| 2017/0193778 A1* | 7/2017 | Langer ............... G08B 13/2462 |
| 2019/0034820 A1 | 1/2019 | Manning |
| 2019/0128676 A1* | 5/2019 | Naik ..................... G06T 19/006 |
| 2019/0351326 A1* | 11/2019 | Eda .......................... A63F 13/63 |
| 2019/0392356 A1* | 12/2019 | Munir ..................... H04L 67/42 |
| 2020/0019726 A1* | 1/2020 | Perecman ............. G06F 21/44 |
| 2020/0050995 A1 | 2/2020 | Ramanand |
| 2020/0302380 A1* | 9/2020 | Nyswonger ............. G06T 17/00 |
| 2020/0334585 A1* | 10/2020 | Petroulas ............ G06F 16/2282 |
| 2021/0153001 A1* | 5/2021 | Eisner ................. H04W 64/003 |
| 2021/0196169 A1* | 7/2021 | Ainsworth ......... G06K 9/00288 |

\* cited by examiner

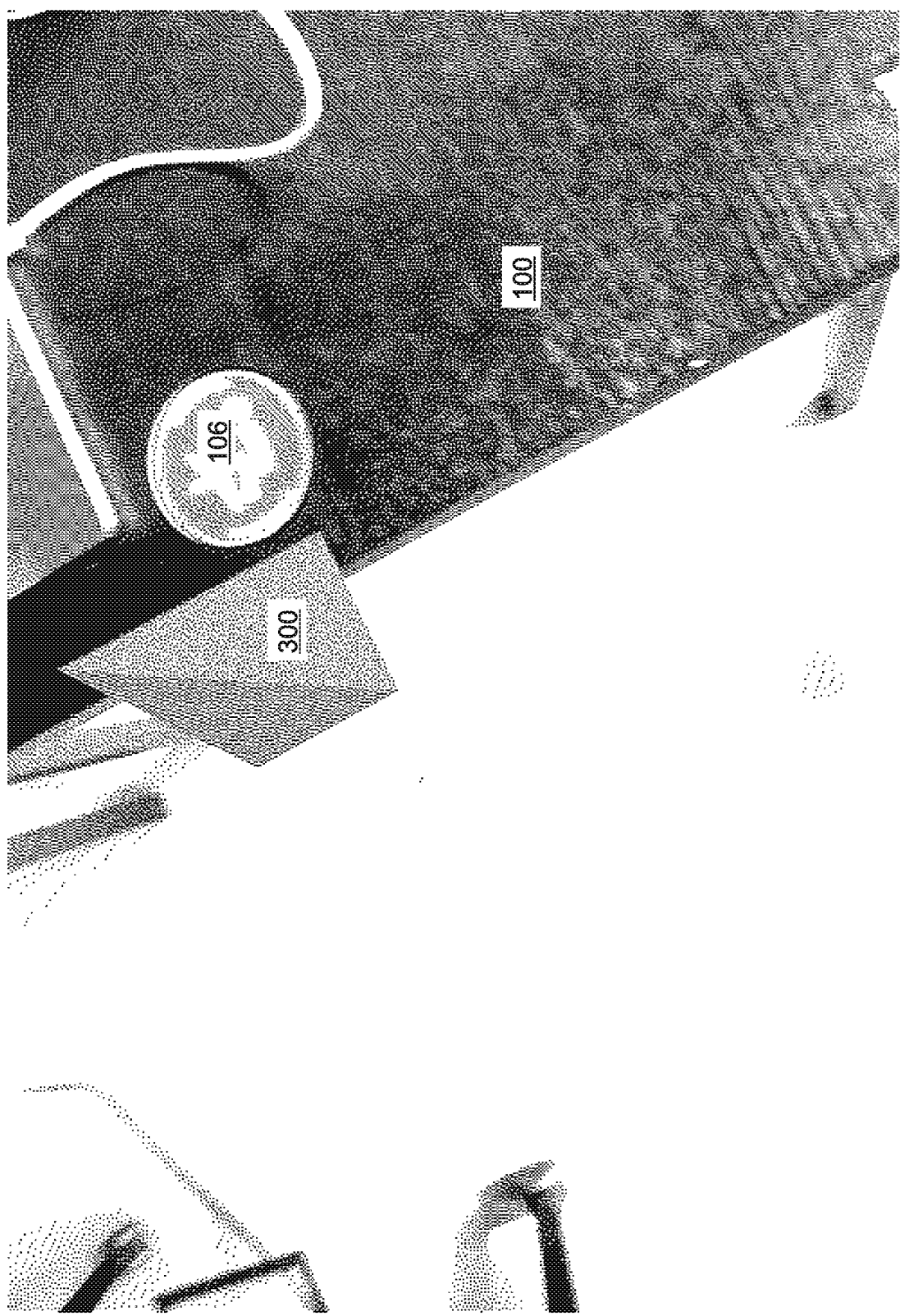

APPARATUS AND METHOD FOR ASSIGNING RESOURCES TO PERSONS WITHIN A FACILITY

RELATED APPLICATIONS

This application is a continuation-in-part of U.S. application Ser. No. 16/894,030, filed Jun. 5, 2020. This application is also a continuation in part of U.S. application Ser. No. 17/039,170, filed Sep. 30, 2020. U.S. application Ser. No. 17/039,170 is a continuation of U.S. application Ser. No. 16/894,030. U.S. application Ser. Nos. 16/894,030 and 17/039,170 are both incorporated herein by reference in their entirety for all purposes.

FIELD OF THE INVENTION

The invention relates to apparatus and methods for reducing the spread of disease, and more particularly, to apparatus and methods for minimizing and effectively responding to cross-contamination of pathogens between persons within a facility.

BACKGROUND OF THE INVENTION

The COVID-19 pandemic, caused by the SARS-CoV-2 virus, has given rise to many new challenges. And while it is generally assumed that the COVID-19 pandemic will not continue indefinitely, nevertheless the emergence of SARS-CoV-2 has greatly heightened public awareness of the risks that are associated with highly transmissible infectious diseases, and of the possibility that another, possibly more virulent pandemic could appear in the future.

Among other challenges, it becomes necessary during a pandemic to limit the cross contamination of pathogens between individuals as much as possible, and to respond efficiently when someone is found to have contracted the virus, so that others who may have been cross-contaminated by the infected person can be identified and tested as quickly as possible.

One effective approach to limiting the spread of pathogens is to implement "social distancing," which generally includes closing or at least limiting the number of personnel present at many workplaces, bars, restaurants, movie theaters, libraries, stadiums, and other facilities where people would normally gather, and also limiting the excursions by individuals outside of their homes as much as possible. Furthermore, whenever it becomes necessary for people to interact with others who are not part of their immediate family, social distancing generally requires maintaining a certain minimum distance between the individuals, such as at least six feet.

Despite the need for social distancing, however, many activities that are essential to the sustenance of the population, and/or to the survival of the economy, require people to gather together within a facility. For example, food production facilities must be populated with workers so that necessary food can be produced, and medical facilities must remain open so that they can tend to the needs of the populace. Furthermore, as the incidence of SARS-CoV-2 infection has stabilized and receded to some extent, it has become desirable, and even necessary in many cases, to reopen additional offices, factories, stores, schools, and other facilities, even though the virus has not been completely eradicated. As a result, the possibility cannot be excluded that an infectious but asymptomatic person could be present at a facility at any given time, and that cross-contamination of other persons who enter the facility could take place.

It will be noted that the term "facility" is used generically herein to refer to any indoor space that may be occupied by a plurality of persons, either simultaneously or at different times, and that the term "persons" is used generically herein to refer to anyone who might occupy such a facility, including workers, managers, support staff, customers, members of the general public, and any other individuals who may have reason to utilize a facility.

One approach to safely occupying and using a facility is to test all persons for infection before they are allowed to enter the facility, in an attempt to ensure that no infected individual is allowed to enter the facility. However, while the capacity to test individuals for infection has increased dramatically, nevertheless it remains impractical in most cases to test every person in each instance before they enter a facility.

Another approach is to attempt to augment social distancing within a facility by limiting and controlling the locations each person occupies and/or the items that the person interacts with while they are within the facility. These locations that a person might occupy and items that a person might interact with can include, for example, chairs, desks, computers, workstations, water fountains, coffee makers, microwave ovens, dining tables, bathroom stalls, bathroom sinks, refrigerators, copiers, printers, etc. It will be noted that the term "resources" is used generically herein to refer to all locations and items that a person might occupy or use while within a facility, and that the term "shared resources" is used generically herein to refer to any resources that might be used by more than one person, either at the same time or at different times.

In some facilities, persons may be permanently assigned to used certain resources, such as computers and desks in a conventional office or cubical environment. However, many resources, such as coffee makers, refrigerators, copiers, printers, and bathroom stalls, will be shared by a plurality of persons, even in a conventional office.

Furthermore, in many facilities persons are not assigned to use specific resources. Instead, most or all resources are shared, in the sense that each person is allowed to select and occupy an available location of their choice each time they visit the facility, and to use whatever computers, copiers, and/or other resources are available. Examples include public and university libraries, gymnasiums, banks, call centers where staffing may vary, facilities that rent temporary office facilities to traveling business people and other customers, and desk "pools" within a business that are temporarily used by employees when visiting from another branch, and/or by employees who work frequently from home or travel extensively and do not require use of a desk at the facility on a daily basis. Examples further include theaters and stadiums where seating is not assigned. In such cases, there is a risk that persons within the facility may choose to occupy locations that are relatively close to each other, even though they could be more widely separated. Also, there is a risk that a newly arrived person may unwittingly occupy a location that was recently used by another person, and which has not been sanitized after the previous use.

One approach to enhancing social distancing within a facility is to reduce the number of desks, chairs, and/or other resources that are provided within the facility, and to space the remainder apart. Occupants are then able to choose whatever resources they wish, and will nevertheless be spaced apart from each other. However, removing large quantities of chairs, desks, etc. from a facility may not be desirable or practical. Furthermore, this approach does not ensure maximum distancing. Also, this approach does not address the possibility of cross contamination by mutual use of shared resources such as drinking fountains, coffee makers, bathroom stalls, etc.

Instead, it is often more effective to assign persons to occupy and/or interact with only specific resources while they are within a facility. For example, each person entering a facility can be assigned to use a specified desk or workstation, sit at a specified table when eating, use a specified bathroom stall, etc. By making appropriate assignments of shared resources, the distancing that is maintained between the persons within the facility can be maximized while they are sitting, working, and/or otherwise interacting with their assigned resources. Proper assignment of shared resources can also avoid, or minimize, the use of a shared resource by a second person too soon after a previous use by a first person. Furthermore, a knowledge of the assignments and usage of shared resources at a facility can enhance the efficiency of ongoing disinfection efforts while the facility is being used.

This approach of assigning specific resources to persons while they are within a facility can also be very helpful if a person is found to be infected with a pathogen subsequent to the person having been within the facility, because a knowledge of the resource assignments that were in effect while, and shortly after, the infected person was within the facility can significantly improve the effectiveness of "contact tracing," by helping to identify other persons who were proximal to the infected person, or who may have interacted with the same resources subsequent to the infected person.

However, the success of this approach can depend crucially on the availability of accurate information regarding the exact locations of the tables, desks, coffee makers, and other shared resources within a facility, especially if space within the facility is limited. If the shared resource locations are not accurately known, then the resource assignments may not provide sufficient distancing between persons within the facility. Furthermore, implementing resource assignments based on inaccurate shared resource location information can create a false sense of security, and can ultimately do more harm than good.

One possibility is to attempt to extract the locations of the shared resources from building plans that may be available for the facility. However, while building plans may accurately represent the locations of walls and certain other fixed structures, they are often inaccurate regarding the locations of desks, tables, appliances, bathroom stalls, and other resources within the interior of a facility, which may not have been included in the building plans, or may have been represented only approximately in the plans to indicate expected usage of each space, whereas the selections and locations of the actual resources may have occurred, or may have changed, after the building plans were drafted, and may differ in type, number, and/or location as compared to any indications that are included in the building plans.

Another approach to ensuring accurate knowledge of shared resource locations is to perform a resource survey by carefully enumerating and measuring the locations of the shared resources within a facility, for example using a tape measure, and then attempting to construct an accurate "resource map" of the shared resource locations. However, while this approach can provide accurate resource locations, it can also be very time consuming and labor intensive. Furthermore, it can be cost-prohibitive to frequently repeat and verify the survey. As a result, such resource maps can easily become outdated as resources are moved, removed, or changed in other ways after the initial survey is completed.

What is needed, therefore, is an apparatus and method of quickly, easily, and accurately enumerating and mapping the locations of shared resources within a facility.

SUMMARY OF THE INVENTION

The present invention is an apparatus and method for quickly, easily, and accurately identifying and mapping the locations of shared resources such as desks, chairs, tables, water fountains, coffee makers, bathroom stalls, refrigerators, copiers, printers, and/or other shared resources that are located within a facility, so that persons within the facility can be assigned to interact with the shared resources in a manner that ensures adequate separation between the persons while they are interacting with their assigned resources, and that increases a separation in time between any use of a shared resource by different persons.

In embodiments, a log is maintained of the resource assignments, and hence the presumed locations of the persons while they are within the facility. Together with the accurately mapped locations of the assigned resources, the logged assignment information can be used to enhance contact tracing when needed.

According to the method of the present invention, "tags" are applied onto, or proximal to, the desks, chairs, tables, coffee makers, bathroom stalls, and/or other shared resources within a facility. The tags may be easily visible to persons within the facility, and may provide resource identifying information to an observer, so that persons within the facility can readily locate and interact with their assigned resources. In other embodiments, separate visibly identifying indicia, such as signs or labels, are associated with the resources, while the tags themselves are not readily visible to an observer, and/or do not present visible information to an observer.

The tags are configured to be sensed by one or more mobile devices. The sensing can be optical, for example by means of a camera included in the mobile device, and/or by RF, infra-red, laser, and/or any other sensing technology as is known in the art. The tags can be passive, such as a paper or plastic label with visually distinct indicia printed thereupon, or the tags can be active, and can be powered for example by a battery or by near-field RF energization.

Each mobile device is configured to sense the tags, and to "map" the tags by at least approximating the location of each of the tags. Technologies that are used by the mobile devices in various embodiments to estimate the locations of the tags within the facility include GPS, optical imaging and feature recognition, sonic echo distance measurements, LIDAR, accelerometers to make inertial measurements of linear and rotational accelerations of the mobile device, and/or other location determining technologies that are known in the art. In embodiments, a plurality of "anchor points" having well-known locations are tagged in each room or other functional space within the facility and are sensed by the mobile device, after which the locations of the other tags within the functional space are estimated relative to the anchor points.

This estimating of tag locations represents a mapping of the resources with which the tags are associated. In embodiments, the estimated tag locations that are determined by the one or more mobile devices is then transferred to a server or other computing device.

In some embodiments, estimations of the locations of the resources as provided by the mobile devices are sufficiently accurate to enable effective and confident assignment of the resources to persons entering the facility. In other embodiments, the estimated locations require verification and possibly also adjustment by a user before assignments of resources can be made. In some of these embodiments, photographs of the room are taken by the mobile devices during the mapping process, and the locations of the tags as estimated by the mobile device or devices are indicated on the photographs, and are used afterward to manually adjust the mapped locations. In other embodiments, for example when it is important to accurately map the locations of the tags in all three-dimensions, the present invention further comprises an augmented reality implementation that enables a user to view the estimated locations of the tags superimposed in real time onto the user's field of view while the user is in the room or other functional space, so that the user can verify the estimated tag locations, and can make any corrections and adjustments to the estimated locations that may be needed.

In various embodiments, architectural plans for the facility are provided to the mobile devices and/or to another computing device, and are used to display the estimated shared resource locations relative to walls, beams, and other structural elements of the facility.

Once accurate locations for all of the tags have been determined by the resource mapping process, the information is used as a basis for assigning the resources to persons who enter the facility. In embodiments, the resource assignments are made for each person before the person is allowed to enter the facility. In some embodiments, the mapped resource locations are presented to one or more operators who are responsible for assigning the resources. In some of these embodiments, the mapped information is transferred to a separate server or other computing device for presentation to and use by one or more of the operators.

In embodiments, the accurate locations of the resources are provided to a computing device, along with assignment criteria such as a minimum distance to be maintained between persons within the facility, and/or a minimum length of time that must elapse between interaction by different persons with the same resource. In some embodiments, information regarding sanitation of resources within the facility is also provided to the computing device. The computing device is then able to provide recommended assignments of the resources to the one or more operators, or directly to persons as they enter the facility. For example, in some embodiments persons are able to interact with one or more automated stations or kiosks when entering and leaving a facility so as to be assigned to desks, tables, workstations, and/or other resources as they enter the facility, and to indicate when they leave the facility that the assigned resources should be released for reassignment.

In some embodiments, measurements of air flow within a facility are also recorded, and are used to develop an enhanced understanding of the directions and distances that airborne pathogens emitted from the vicinity of a given resource are likely to travel. This enhanced understanding can then be used to further enhance the effectiveness of resource assignments and improving contact tracing. For example, minimum distances to be maintained between persons within the facility can be adjusted according to resource locations and the local air flow patterns.

One general aspect of the present invention is a method of minimizing cross-contamination of pathogens between persons within a facility. The method includes identifying a plurality of shared resources within the facility, locating a plurality of resource tags within the facility, each of the shared resources being associated with, and proximal to, at least one of the resource tags, providing a mobile device that is able to sense the resource tags, said mobile device, upon sensing any one of the resource tags, being able to automatically approximate a location of the resource tag within the facility, while the mobile device is within the facility, causing the mobile device to sense each of the resource tags, and to determine an estimated location for each of the resource tags, according to the estimated locations of the resource tags, assigning the shared resources to the persons for use by the persons within the facility, where the assigning of the shared resources is configured to enhance distancing between the persons while they are within the facility, and ensure a separation in time between any use of at least one of the shared resources by one of the persons and use of the same shared resource by another of the persons.

In embodiments, the mobile device is able to sense at least one of the resource tags by recognizing an image of the resource tag included in an optical image of a scene that includes the resource tag.

In any of the above embodiments, the mobile device can be able to sense at least one of the resource tags by receiving at least one of infrared and electromagnetic energy emitted by the resource tag.

In any of the above embodiments, the mobile device can include an accelerometer that is configured to detect at least one of linear and rotational accelerations of the mobile device.

In any of the above embodiments, the mobile device can includes a LIDAR feature that is able, upon sensing one of the resource tags, to estimate a direction and a distance between the mobile device and the resource tag.

Any of the above embodiments can further include locating an anchor tag proximal to and associated with an anchor feature within the facility, said mobile device being able to sense the anchor tag, said anchor feature having a well-defined location within the facility, sensing of the anchor tag by the mobile device, and approximating the location of the resource tag within the facility relative to the anchor tag.

Any of the above embodiments can further include adjusting the estimated locations of the resource tags to obtain adjusted resource tag locations that accurately correspond with actual locations of the resource tags within the facility, and assigning the shared resources to the persons according to the adjusted estimated locations of the resource tags. In some of these embodiments, adjusting the estimated locations of the resource tags includes superimposing the estimated locations of the resource tags onto at least one optical image of an interior of the facility. In any of these embodiments adjusting the estimated locations of the resource tags can include providing the estimated locations of the resource tags to an augmented reality device, and causing the augmented reality device to present the estimated locations of the resource tags to a user by superimposing the estimated locations of the resource tags onto a field of view of the user as the user is observing the resource tags within the facility. In some of these embodiments the method further comprises, after the estimated locations of the resource tags have been adjusted, presenting by the augmented reality device of the adjusted resource tag locations to the user by superimposing the adjusted locations of the resource tags onto the field of view of the user as the user is observing the resource tags within the facility. And any of these embodiments can further include holding or wearing by the user of an augmented reality tool that can be sensed by the mobile device, and wherein the adjusting of the resource tag locations includes a movement by the user of the augmented reality tool as the augmented reality tool is sensed by the mobile device, said movement indicating a corresponding adjustment to be made by the mobile device to the estimated location of one of the resource tags.

Any of the above embodiments can further include providing the estimated locations of the resource tags to a computing device.

Any of the above embodiments can further include providing distancing rules to the computing device, and providing to an operator by the computing device of recommended assignments of the shared resources to the persons for use by the persons within the facility.

Any of the above embodiments can further include providing distancing rules to the computing device, and assigning by the computing device of the shared resources to the persons for use by the persons within the facility.

In any of the above embodiments, the assigning of the shared resources to the persons can include assigning one of the shared resources to one of the persons as the person enters the facility, and releasing said shared resource from assignment to said one of the person as the person leaves the facility.

Any of the above embodiments can further include dividing the persons into a plurality of sub-groups, and wherein assigning the shared resources to the persons includes assigning the shared resources such that use of the same shared resource by members of more than one of the sub-groups is minimized or eliminated.

Any of the above embodiments can further include maintaining a log of said assigning of the shared resources to the persons. Some of these embodiments further include, upon discovering that a first of the persons was previously within the facility while infected with a pathogen, analyzing the log to identify a second of the persons who is at heightened risk of cross contamination by the pathogen, and applying at least one mitigating action to the second person. In some of these embodiments the at least one mitigating action includes applying a test to the second person to determine if the second person has become infected with the pathogen. In any of these embodiments, identifying the second person can include determining that identical or proximal shared resources were assigned to the first and second persons at the same time, or at times that were closely spaced apart. And any of these embodiments can further include identifying the second person includes determining a pattern of air currents proximal to one or more resources within the facility that were simultaneously assigned to the first and second persons.

A second general aspect of the present invention is a method of minimizing cross-contamination of pathogens between persons within a facility. The method includes identifying a plurality of shared resources within the facility, locating a plurality of resource tags within the facility, each of the shared resources being associated with, and proximal to, at least one of the resource tags, providing a mobile device that is able to sense the resource tags, said mobile device, upon sensing any one of the resource tags, being able to automatically approximate a location of the resource tag within the facility, while the mobile device is within the facility, causing the mobile device to sense each of the resource tags, and to determine an estimated location for each of the resource tags, providing the estimated locations of the resource tags to an augmented reality device, causing the augmented reality device to present the estimated locations of the resource tags to a user by superimposing the estimated locations of the resource tags onto a field of view of the user as the user is observing the resource tags within the facility, adjusting by the user of the estimated locations of the resource tags to obtain adjusted resource tag locations that accurately correspond with actual locations of the resource tags within the facility, presenting by the augmented reality device of the adjusted resource tag locations to the user by superimposing the adjusted locations of the resource tags onto the field of view of the user as the user is observing the resource tags within the facility, and according to the adjusted resource tag locations, assigning the shared resources to the persons for use by the persons within the facility, said assigning being configured to enhance distancing between the persons while they are within the facility.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3A is a perspective view of a superposition by an augmented reality device of an estimated tag location onto an actual scene according to an embodiment of the present invention, wherein the estimated tag location is inaccurate;

DETAILED DESCRIPTION

The present invention is an apparatus and method for quickly, easily, and accurately identifying and mapping the locations of shared resources that are located within a facility, so that persons within the facility can be assigned to interact with the shared resources in a manner that enhances distancing between persons while they are interacting with their assigned resources, and increases a separation in time between any use of a shared resource by different persons.

Figure 1A:
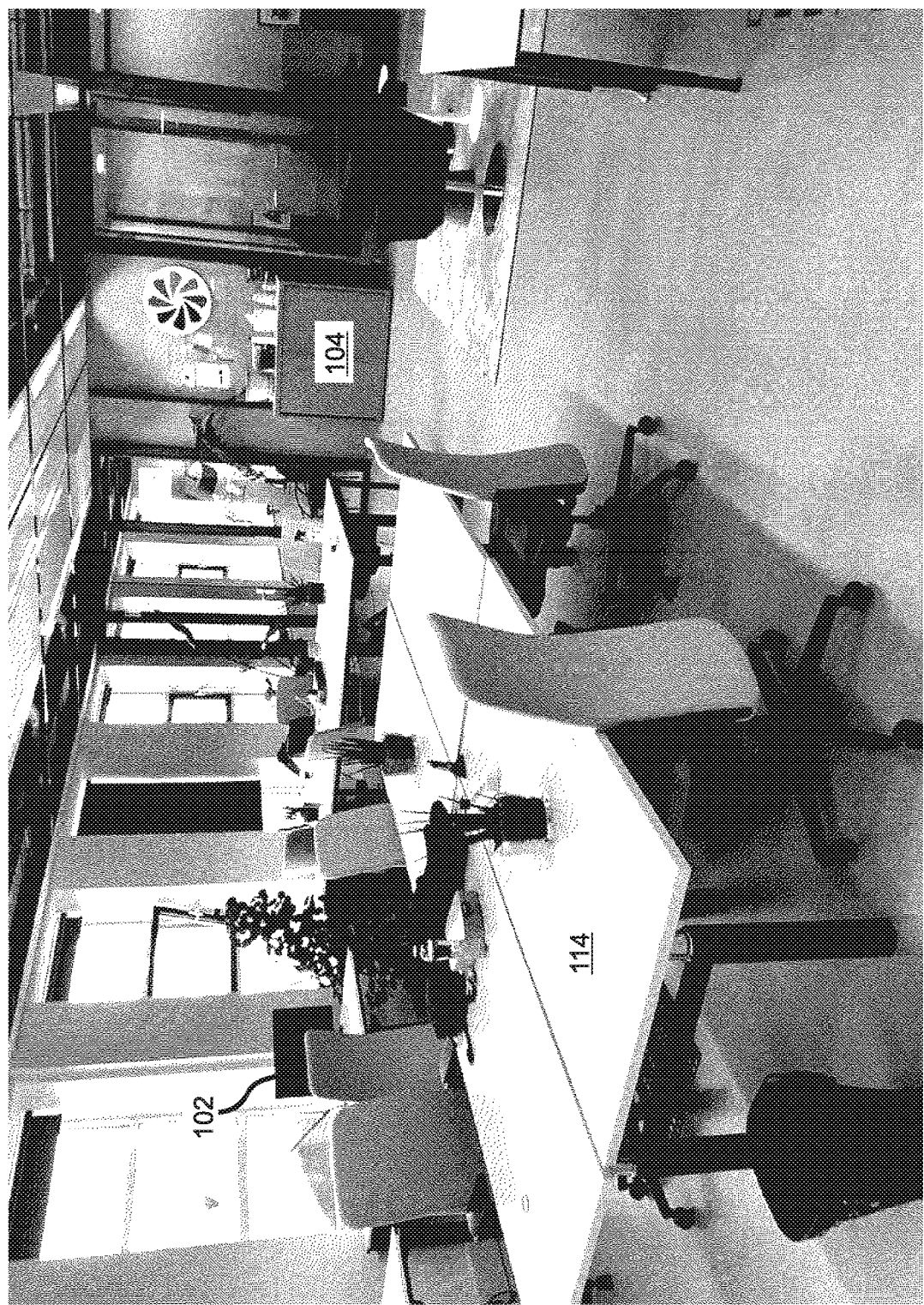
FIG. 1A is a perspective view of a functional space within a facility, according to the prior art, that contains a plurality of shared resources.

In general, shared resources within a facility can include desks, chairs, tables, water fountains, coffee makers, microwave ovens, bathroom stalls, bathroom sinks, refrigerators, copiers, printers, etc. FIG. 1A illustrates an exemplary functional space that is a large room containing a plurality of shared resources, including work tables 114 and computer stations 102, as well as a coffee station 104. FIG. 1C illustrates a sofa 108 and a chair 110 as additional shared resources in the functional space that is a lounge and/or work area, while FIG. 1D illustrates a bathroom that includes bathroom stalls 116 as shared resources.

It will be noted that in the following discussion, and in all drawings subsequent to FIG. 1D, all of the shared resources in a facility are referred to, and are indicated in the drawings by, the same, generic item number 100.

Figure 1B:
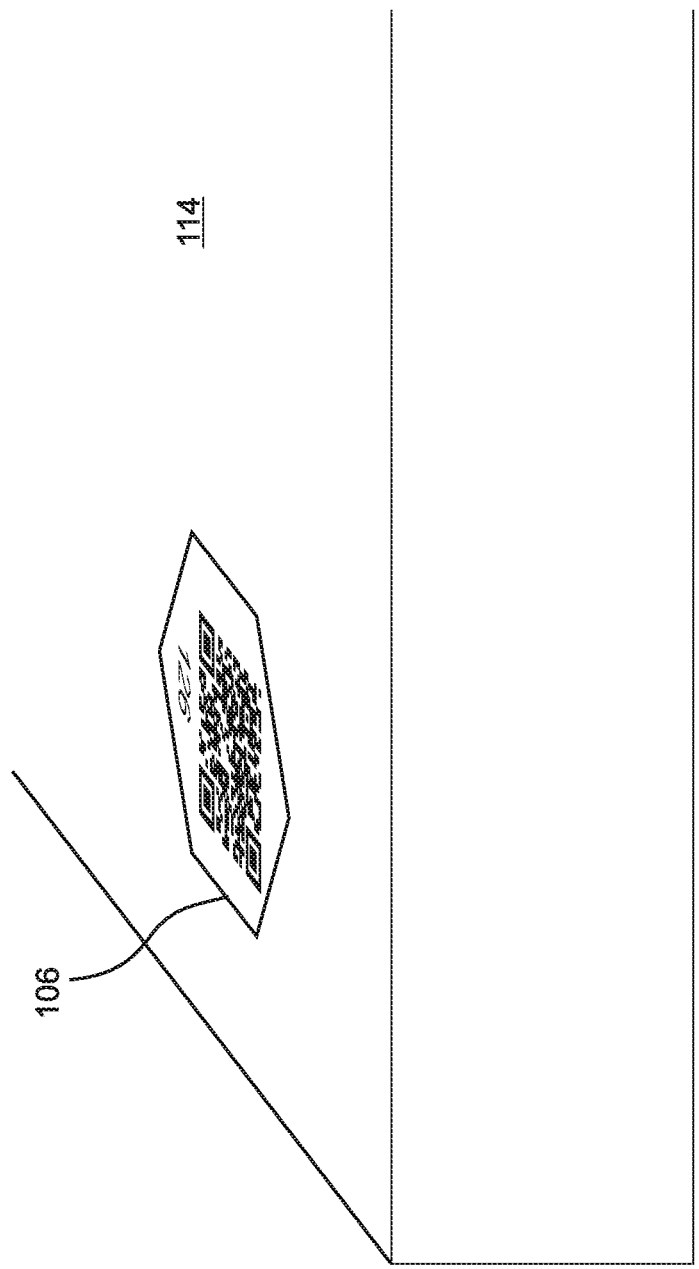
FIG. 1B is a perspective view of a shared resource desk to which a tag has been applied according to an embodiment of the present invention.
Figure 1C:
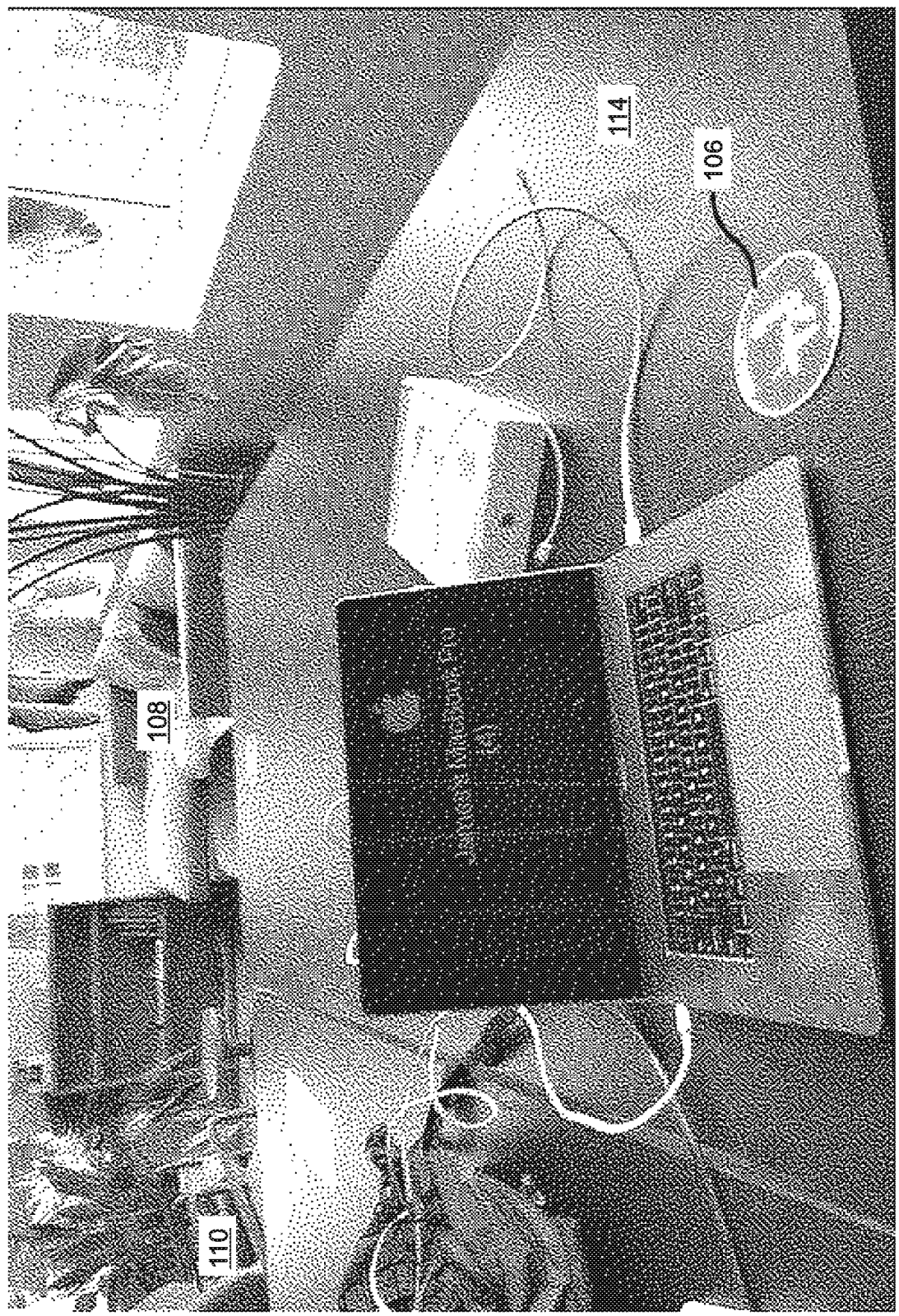
FIG. 1C is a perspective view of the functional space of FIG. 1A showing a tag applied to a shared resource table according to an embodiment of the present invention.
Figure 1D:
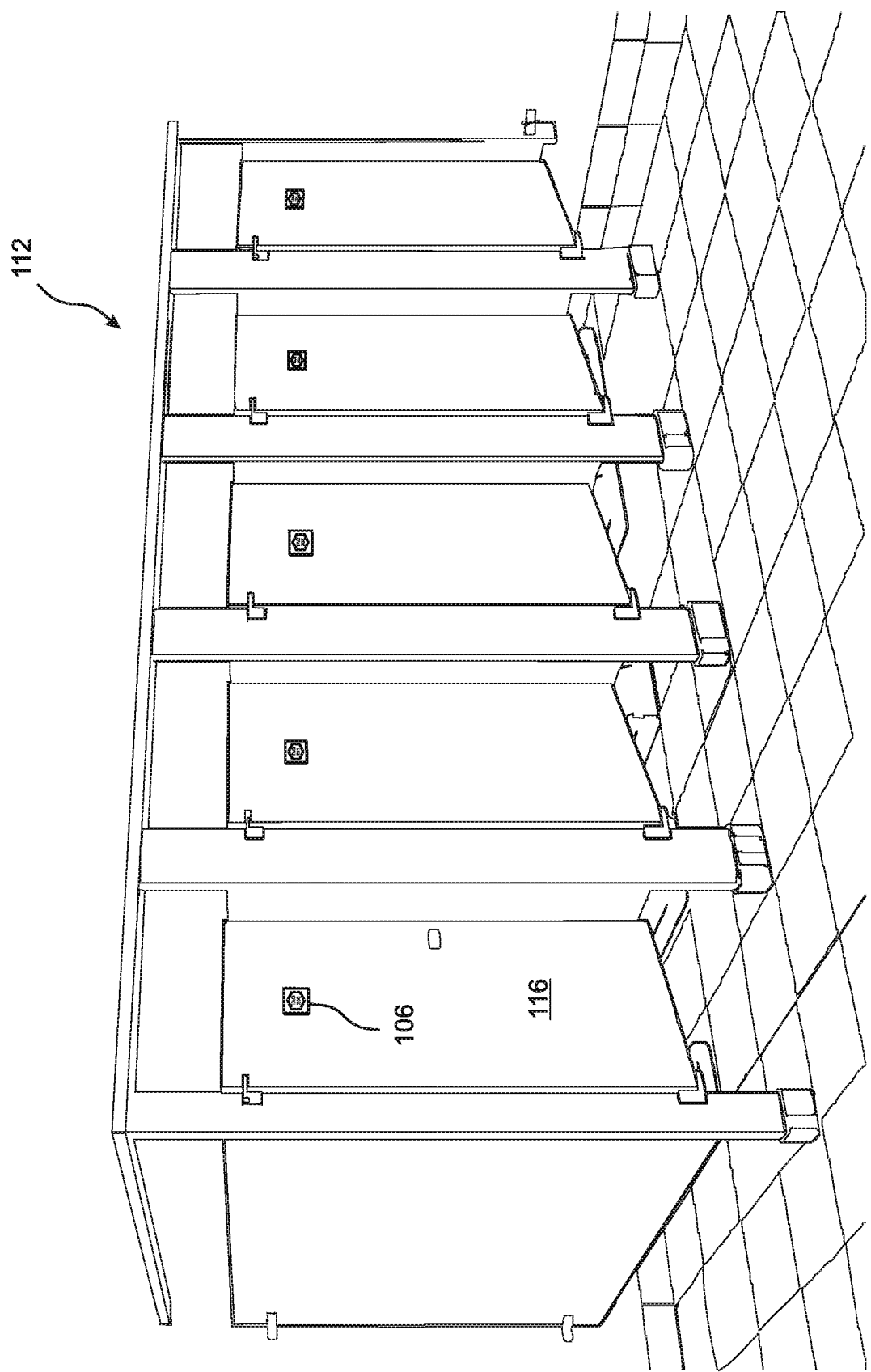
FIG. 1D is a perspective view of a plurality of shared resource bathroom stalls to which tags have been applied according to an embodiment of the present invention.

With reference to FIGS. 1B through 1D, the method of the present invention includes applying, "tags" 106 onto, or proximal to, the shared resources 100 within a facility. The tags 106 may be easily visible to persons within the facility, and may provide resource identifying information to an observer, so that persons within the facility can readily locate and interact with their assigned resources 100. In other embodiments, separate visibly identifying indicia, such as signs or labels, are associated with the shared resources 100, while the tags themselves are not readily visible to an observer, and/or do not present visible information to an observer.

Figure 2A:
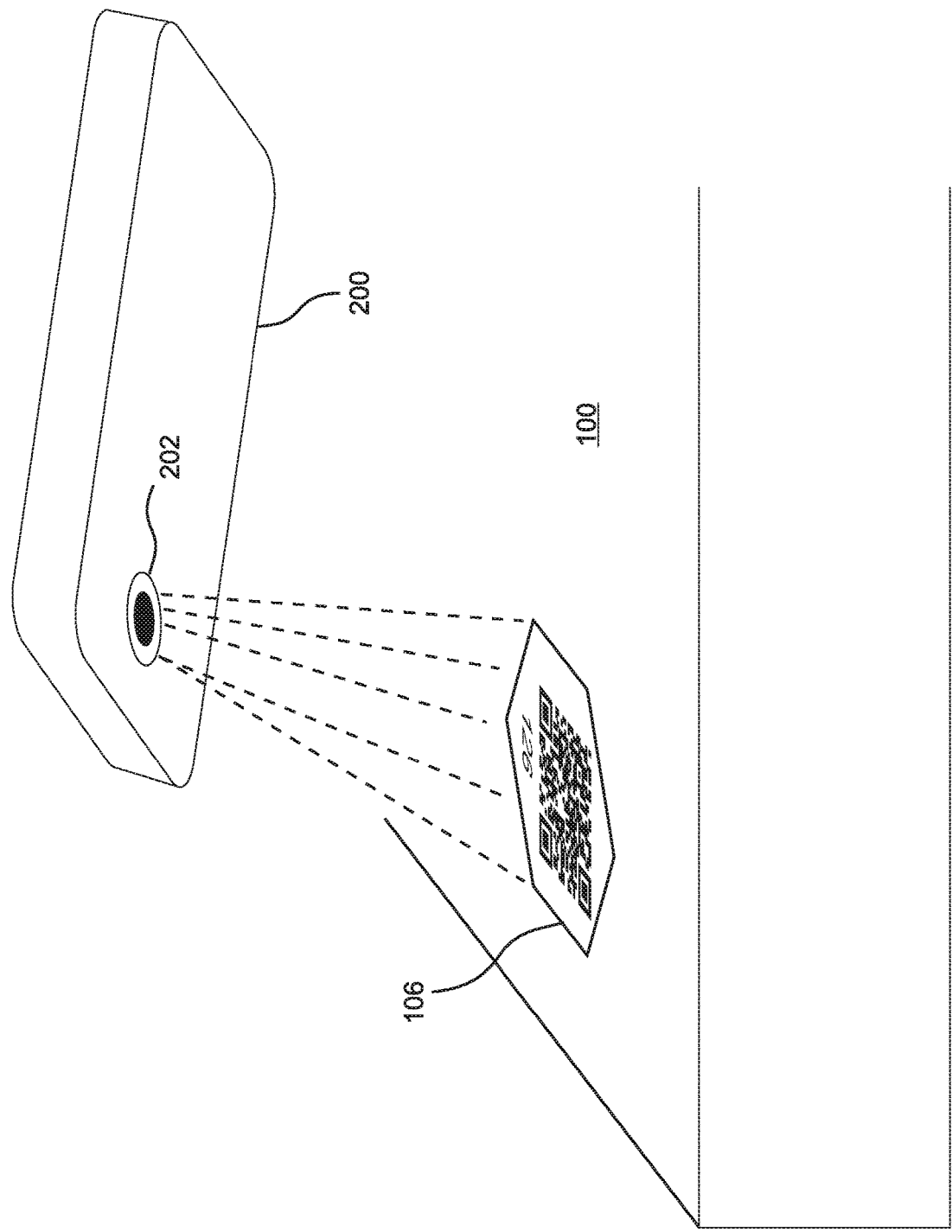
FIG. 2A is a perspective view of the tag of FIG. 1B being optically sensed by a mobile device according to an embodiment of the present invention.
Figure 2B:
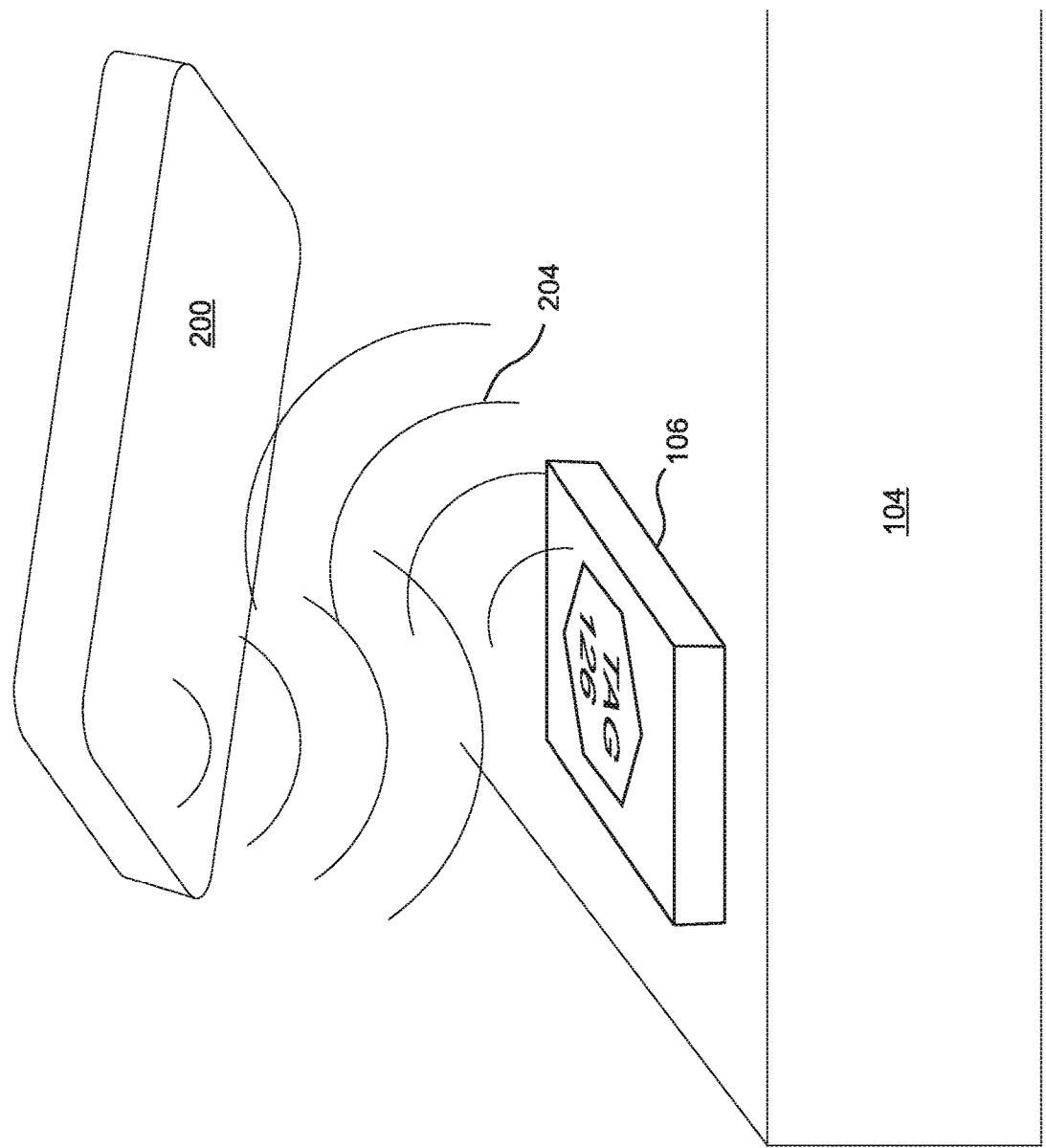
FIG. 2B is a perspective view of a mobile device using radio frequency detection to sense a near-field RF energized tag that is attached to a shared resource desk according to an embodiment of the present invention.

With reference to FIG. 2A, the tags 106 are configured to be sensed by mobile devices 200, which can be "smart" mobile phones, computer tablets, laptop computers, etc. The sensing can be optical, for example by means of a camera 202 included in the mobile device 200, and/or by RF, infra-red, laser, and/or any other sensing technology that is known in the art. The tags can be passive, such as a paper or plastic label with visually distinct indicia printed thereupon, as is illustrated in FIGS. 1A through 2A. Or, with reference to FIG. 2B, the tags 106 can be active, and can be powered for example by a battery or by near-field RF energization 204.

Each of the mobile devices 200 is configured to be held by a user and to automatically "map" the tags by approximating the location of each of the tags 106. In embodiments, "anchor tags" are applied to a plurality of "anchor points" at well characterized locations in each room or other functional space within the facility, and are sensed by the mobile device 200 to determine a spatial frame of reference within the functional space, after which the locations of the other tags 106 within the functional space are estimated relative to the known locations of the anchor points. Technologies that are used by the mobile devices 200 in various embodiments to estimate the locations of the tags 106 within the facility include GPS, optical imaging and feature recognition, sonic echo distance measurements, LIDAR, inertial measurements of linear and rotational accelerations of the mobile device, and/or other location determining technologies that are known in the art. The location determining technologies can include technologies that are integral to the mobile device, and/or technologies that are separate from the mobile device but are attached to, or otherwise cooperative with, and in data communication with the mobile device. This mapping of tag locations is equivalent to a mapping of the locations of the resources 100 with which the tags 106 are associated.

In embodiments, each of the mobile devices 200 is also configured to track its own location and orientation relative to exterior and/or interior walls, doors, windows, and/or other fixed and well-characterized structures within the facility.

In some embodiments, the mapped locations of the resources 100 as provided by the mobile devices 200 are sufficiently accurate to enable effective and confident assignment of the resources 100 to persons entering the facility. In other embodiments the mapped locations of the tags 106 may be approximate, and may require verification and possibly also adjustment by a user before assignments of resources 100 can be made. In some of these embodiments, photographs similar to FIG. 1A are taken by each mobile device 200 during the mapping process, and the locations of the tags 106 as measured by the mobile device 200 or devices are indicated on the photographs, which are then used to manually adjust the mapped locations.

Figure 6:
FIG. 6 illustrates an indication to a person by an augmented reality device of the location of a shared resource that has been assigned to the person.

With reference to FIGS. 3A and 6, in other embodiments, for example when it is important to accurately map the three-dimensional locations of the tags, an augmented reality is implemented by the mobile device 200 and is displayed to the user by means of augmented reality glass or goggles 600 (FIG. 6) worn by the user 602 (FIG. 6) having transparent lenses onto which the augmented reality device displays the mapped locations 300 of the tags 106 to a user superimposed in real time onto the user's field of view while the user is present in the room or other functional space, so that the user can verify the mapped tag locations 300, and can make any corrections to the mapped locations 300 that may be needed. In embodiments the augmented reality is implemented by the mobile device 200, and is displayed to the user by means of augmented reality glasses or goggles worn by the user having transparent lenses onto which the mapped locations 300 are projected.

Figure 3B:
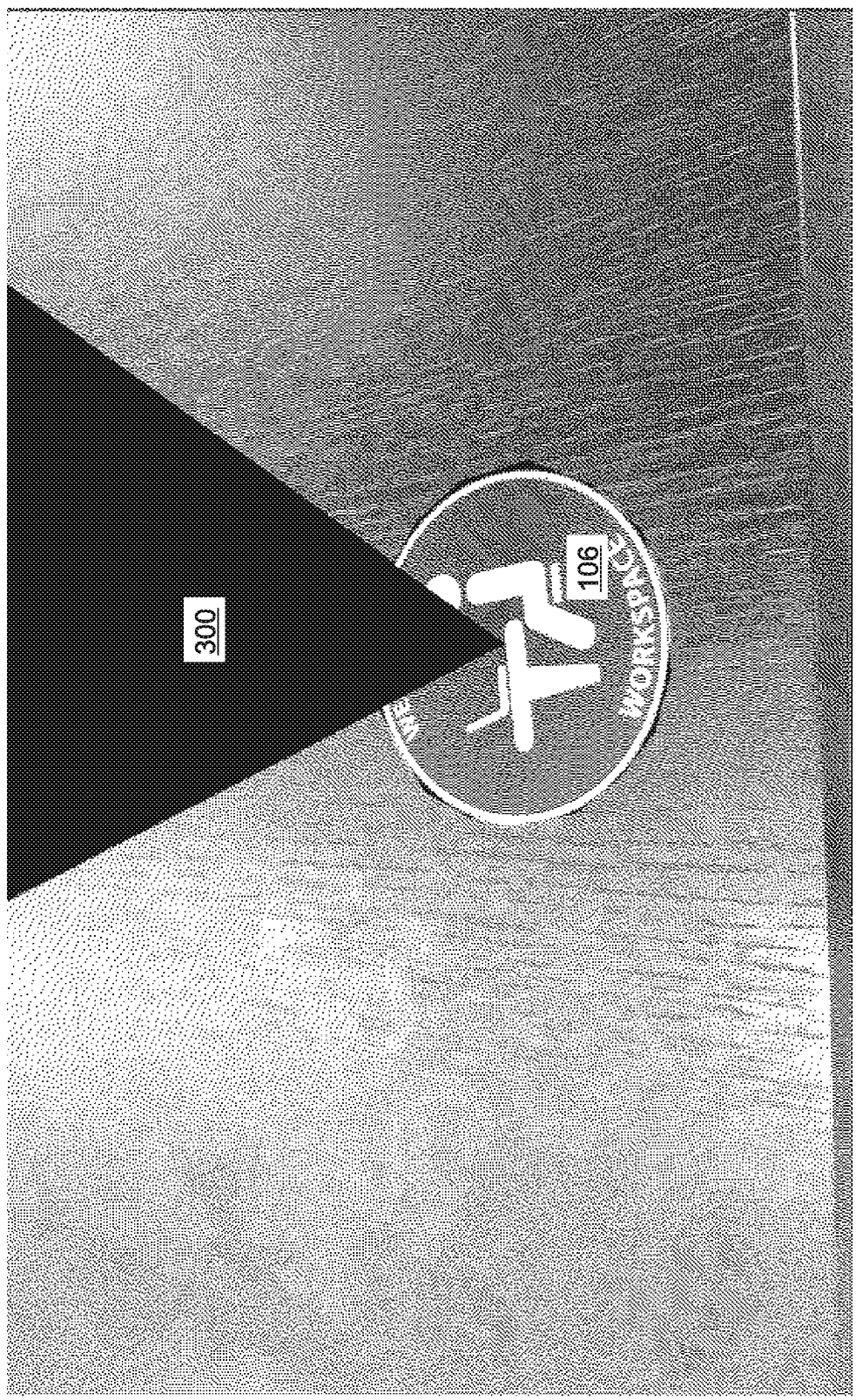
FIG. 3B is a perspective view of a superposition by an augmented reality device of an estimated tag location onto an actual scene according to an embodiment of the present invention, wherein the estimated tag location has been adjusted and is accurate.

In FIG. 3A it can clearly be seen, based on the superposition of the mapped location 300 onto the user's field of view, that the mapped location 300 is not accurately aligned with the tag 106. In FIG. 3B, the user has made adjustments to the mapped location 300, so that it is precisely aligned in all three dimensions with the location of the tag 106. In some embodiments, adjustments to the mapped locations 300 are made via a keypad, touch screen, or other input mechanism (not shown) of the mobile device 200. In other embodiments, the user holds or wears a tool, such as a glove (not shown), that can be sensed by the mobile device 200, whereby the user adjusts the mapped locations 300 by using the tool to effectively "push" and move the mapped location indicator 300 in virtual space until it is accurately superimposed onto the location of the tag 106.

Figure 3C:
FIG. 3C is a perspective view of a functional space within a facility wherein accurately adjusted estimated tag locations have been superposed by an augmented reality device onto an actual scene, according to an embodiment of the present invention.
Figure 3D:
FIG. 3D is a perspective view of a functional space within a facility wherein accurately adjusted estimated tag locations have been superposition by an augmented reality device onto an actual scene, according to an embodiment of the present invention.
Figure 4:
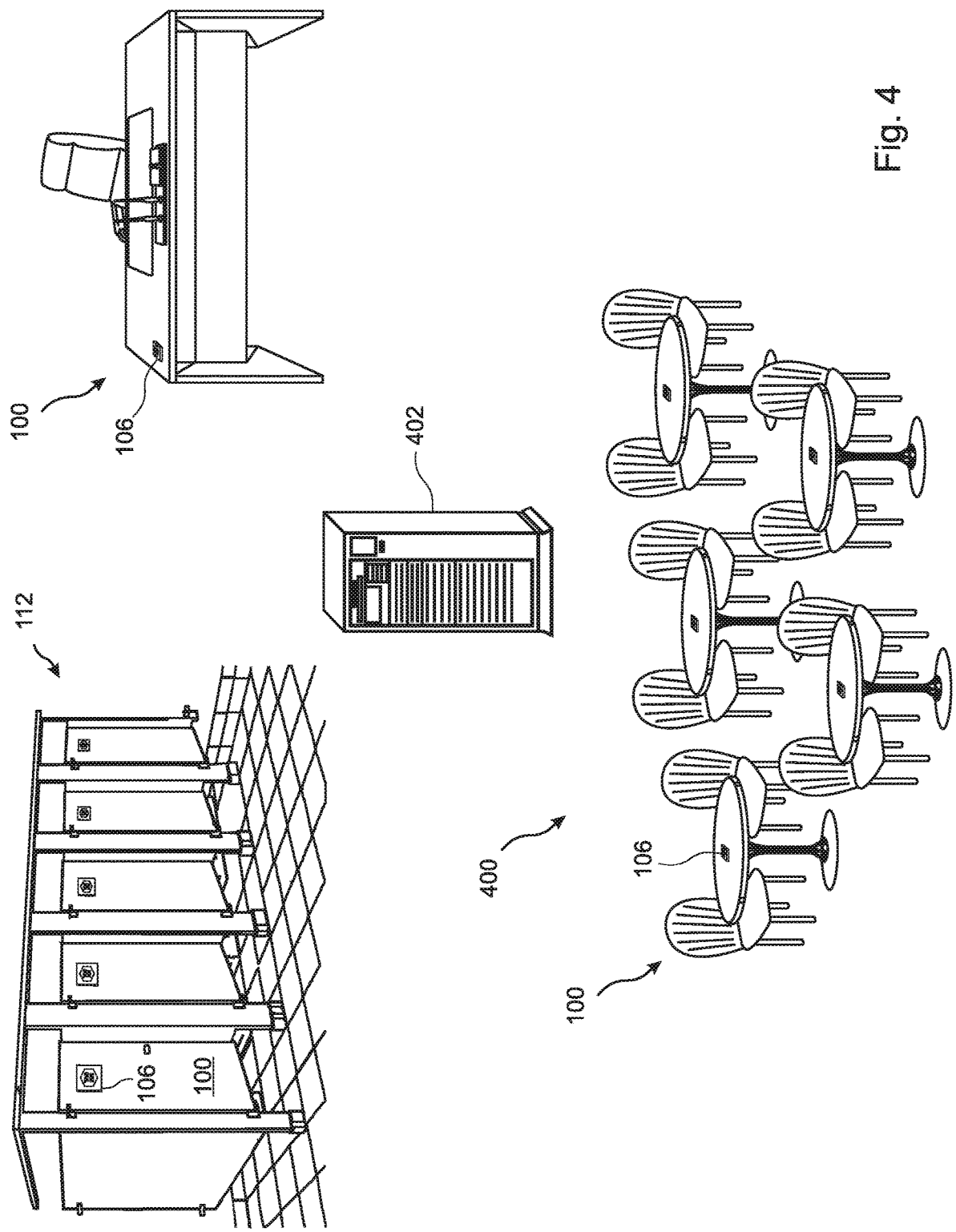
FIG. 4 illustrates a server in relation to a plurality of functional spaces within a facility, each of the functional spaces containing a plurality of tagged shared resources.

With reference to FIGS. 3C and 3D, this process is continued until the locations of all of the tags 106 have been accurately mapped 300 within the functional space. With reference to FIG. 4, the process is repeated for each functional space within the facility, including for example bathrooms 112, and dining facilities 400.

With continued reference to FIG. 4, in embodiments the tag locations that are determined by the one or more mobile devices 200 are transferred to a server 402 or other computing device, either in real time as they are acquired or in total after the mapping has been completed.

Figure 5:
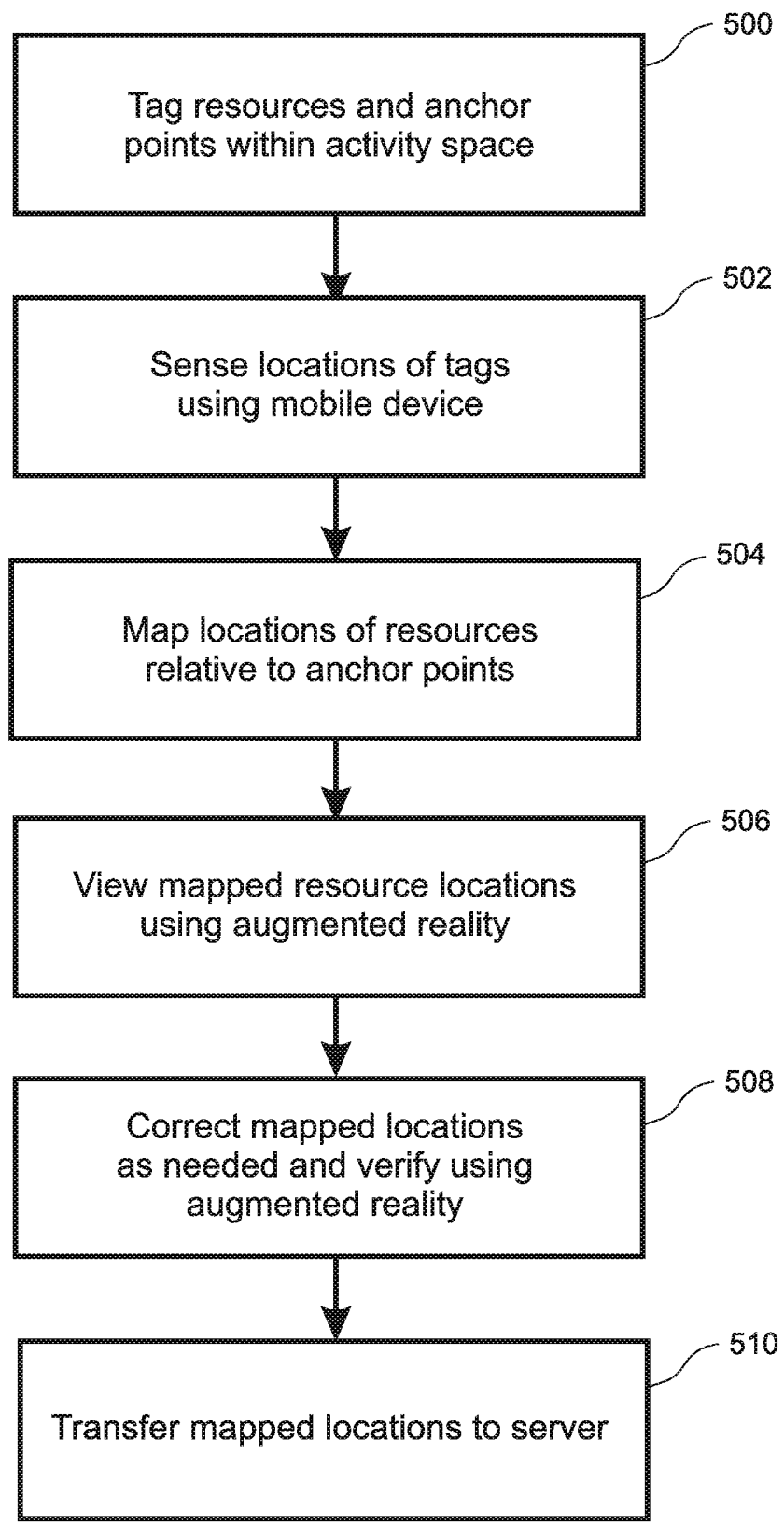
FIG. 5 is a flow diagram that illustrates a method of accurately determining tag locations that are associated with shared resources within a facility according to an embodiment of the present invention.

FIG. 5 is a flow diagram that summarizes the shared resource mapping method that is carried out in embodiments of the present invention. First, tags 106 are applied 500 to the shared resources in the facility, and in embodiments also to a plurality of anchor points within each function space of the facility. At least one mobile device 200 is then used to sense 502 the tags 106. The mobile device(s) 200 estimate(s) the tag locations 504 relative to the anchor points using position determining technology included in, or cooperative with, the mobile device 200 that enables the mobile device to estimate its own location within each functional space, as well as the directions and distances from the mobile device 200 to the sensed tags 106.

In embodiments, augmented reality is used to superimpose the mapped tag locations 300 onto a user's field of view 506, and any required adjustments to the mapped locations 300 are made by the user 508. The adjusted tag locations 300 are then transferred 510 to a server 402 or other computing device, either during the mapping process or once the mapping has been completed. The transfer of the mapping information to the server 402 can be wireless transfer, or by any other means known in the art of transferring data between computing devices.

In various embodiments, architectural plans for the facility are provided to the mobile devices 200 and/or to another computing device 402, and are used to further cross-check the accuracy of the estimated tag locations 300 relative to walls, beams, and other structural elements of the facility. The mapped tag locations can also be superimposed onto the architectural plans for display of the mapped locations, for example to an operator who is responsible for assigning resources to persons as they enter the facility.

Once accurate locations for all of the tags 106 have been determined by the resource mapping process, the information is used as the basis for assigning the resources 100 to persons who enter the facility. With reference to FIG. 6, in embodiments augmented reality 600 is implemented to assist persons 602 entering the facility in locating and identify their assigned resources 604.

In embodiments, the resource assignments are made for each person before the person is allowed to enter the facility. In some embodiments, one or more of the mobile devices 200 present the mapping information for use by one or more operators who are responsible for assigning the resources. In other embodiments, the mapping information is transferred to a separate server 402 or other computing device for presentation to and use by one or more of the operators.

In various embodiments, the accurate locations of the tags 106, and hence of the shared resources 100, are provided to a computing device 402, along with assignment criteria such as a minimum distance to be maintained between persons within the facility and/or a minimum length of time that must elapse between interaction by different persons with the same resource. In some embodiments, information regarding sanitation of resources within the facility is also provided to the computing device 402. The computing device is then able to provide recommended assignments of the resources 100 to the one or more operators, or directly to persons as they enter the facility. For example, in some embodiments persons are able to interact with one or more automated stations or kiosks when entering and leaving a facility so as to be assigned to desks, tables, workstations, or other resources 100 as they enter, and to indicate when they leave that the assigned resources 100 should be released for reassignment.

In embodiments, a log is maintained of the resource assignments, and hence the presumed locations of the persons while they are within the facility. Together with the accurately mapped locations 300 of the assigned resources 100, the logged assignment information can be used to enhance contact tracing when needed.

Figure 7:
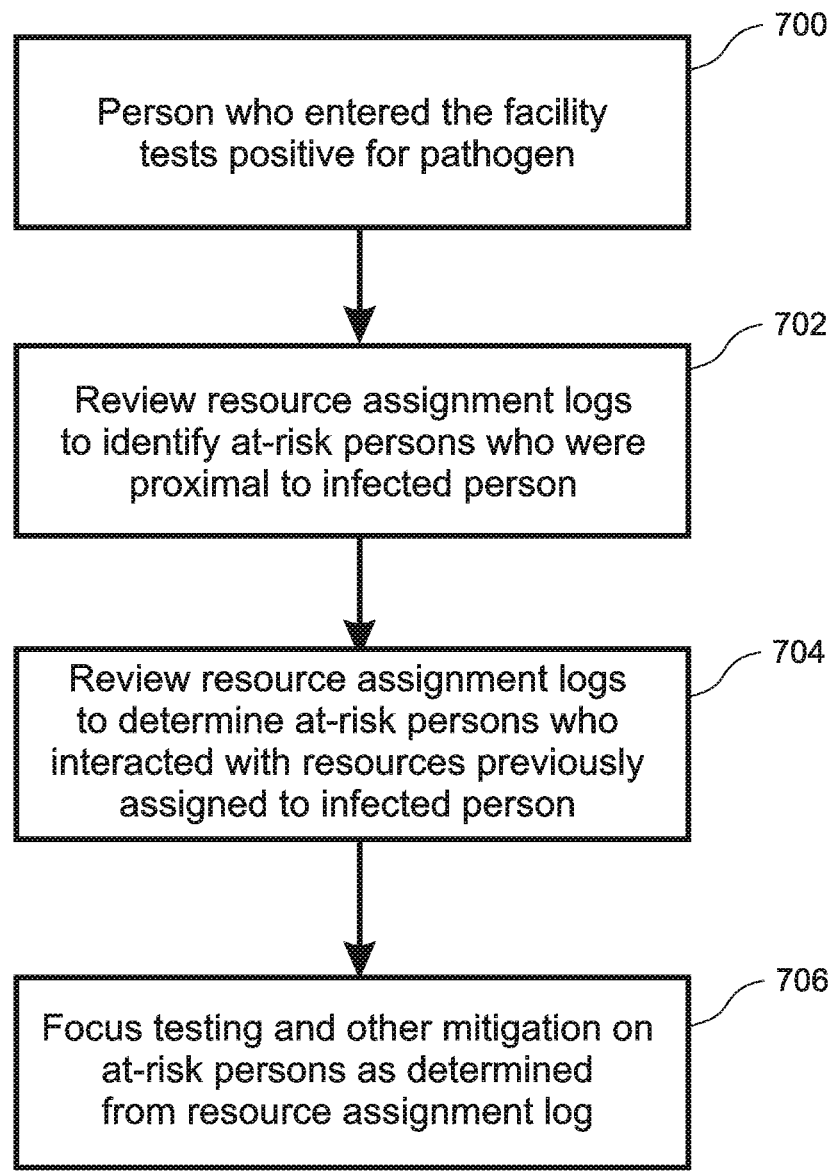
FIG. 7 is a flow diagram that illustrates a method, according to an embodiment of the present invention, of using a log of shared resource assignments to enhance contact tracing upon discovery that an infected person was previously within a facility.

With reference to FIG. 7, according to embodiments of the invention, if it is discovered that a person who is infected with a pathogen has previously entered the facility 700, then the resource assignment logs are reviewed to identify any other persons who were simultaneously assigned to resources that were proximal 702 to resources assigned to the infected person 702, and also to identify persons who may have been assigned to use the same resources 704 as those that were assigned to the infected person, either during the same time period (such as a shared bathroom stall) or immediately after the assignment to the infected person was terminated (such as being assigned to a workstation that was recently vacated by the infected person). Testing and/or other mitigation efforts are then applied 706 to the persons who are identified by the above process.

In some embodiments, measurements of air flow within a facility are also recorded, and are used to develop an enhanced understanding of the directions and distances that airborne pathogens emitted from the vicinity of a given resource 100 are likely to travel. This enhanced understanding can then be used to further enhance the effectiveness of resource assignments and to improve contact tracing. For example, minimum distances to be maintained between persons within the facility can be adjusted in view of the local air flow patterns at the locations of the shared resources 100.

In embodiments, the assignment of shared resources to persons within a facility can include creating virtual sub-groups of the persons, and then configuring the resource assignments such that members of a sub-group may interact at different times with the same resources, but will rarely or never interact with resources that have been previously or concurrently assigned to a person who is outside of their sub-group. With respect to resources that may be concurrently assigned to and intermittently shared by more than one person during a period of common occupation of the facility, such as bathroom stalls, sinks, lunch tables, water fountains, coffee makers, copiers, printers, etc., this can be accomplished by assigning each such resource exclusively to members of only one sub-group. Similarly, when there is a pattern of the same persons repeatedly visiting the facility at different times or on different occasions, sub-groups can be created by ensuring that resources which are typically assigned to only one person while the person is within the facility, such as desks and computers, are always assigned to members of a specified sub-group.

Accordingly, if a person is found to be infected after having visited the facility, testing and other mitigation efforts can be focused primarily on the other members of the infected person's sub-group. Furthermore, dividing persons into sub-groups in this manner can create virtual "firewalls" that can impede any spread of infection within a facility, whereby if there is any spread of infection, it will most likely be limited only to other persons within the sub-group of the infected person, or to only a few sub-groups, and is less likely to spread among all persons within the facility.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of assigning resources to persons within a facility, the method comprising:
   identifying a plurality of shared resources within the facility;
   locating a plurality of physical resource tags within the facility, each of the shared resources being associated with, and proximal to, at least one of the physical resource tags;
   providing a mobile device that is able to sense the physical resource tags, said mobile device, upon sensing any one of the physical resource tags, being able to automatically approximate a location of the physical resource tag within the facility;
   while the mobile device is within the facility, causing the mobile device to sense each of the physical resource tags, and to determine an estimated location for each of the physical resource tags;
   adjusting the estimated locations of the resource tags to obtain adjusted resource tag locations that accurately correspond with actual locations of the resource tags within the facility;
   according to the adjusted estimated locations of the physical resource tags, assigning the shared resources to the persons for use by the persons within the facility, said assigning being configured to:
   enhance distancing between the persons while they are within the facility; and
   ensure a separation in time between any use of at least one of the shared resources by one of the persons and use of the same shared resource by another of the persons.

2. The method of claim 1, wherein the mobile device is able to sense at least one of the resource tags by recognizing an image of the resource tag included in an optical image of a scene that includes the resource tag.

3. The method of claim 1, wherein the mobile device is able to sense at least one of the resource tags by receiving at least one of infrared and electromagnetic energy emitted by the resource tag.

4. The method of claim 1, wherein the mobile device includes an accelerometer that is configured to detect at least one of linear and rotational accelerations of the mobile device.

5. The method of claim 1, wherein the mobile device includes a LIDAR feature that is able, upon sensing one of the resource tags, to estimate a direction and a distance between the mobile device and the resource tag.

6. The method of claim 1, further comprising:
   locating an anchor tag proximal to and associated with an anchor feature within the facility, said mobile device being able to sense the anchor tag, said anchor feature having a well-defined location within the facility;
   sensing of the anchor tag by the mobile device; and
   approximating the location of the resource tag within the facility relative to the anchor tag.

7. The method of claim 1, wherein adjusting the estimated locations of the resource tags includes superimposing the estimated locations of the resource tags onto at least one optical image of an interior of the facility.

8. The method of claim 1, wherein adjusting the estimated locations of the resource tags includes:
   providing the estimated locations of the resource tags to an augmented reality device; and
   causing the augmented reality device to present the estimated locations of the resource tags to a user by superimposing the estimated locations of the resource tags onto a field of view of the user as the user is observing the resource tags within the facility.

9. The method of claim 8, wherein the method further comprises, after the estimated locations of the resource tags have been adjusted, presenting by the augmented reality device of the adjusted resource tag locations to the user by superimposing the adjusted locations of the resource tags onto the field of view of the user as the user is observing the resource tags within the facility.

10. The method of claim 8, further comprising holding or wearing by the user of an augmented reality tool that can be sensed by the mobile device, and wherein the adjusting of the resource tag locations includes a movement by the user of the augmented reality tool as the augmented reality tool is sensed by the mobile device, said movement indicating a corresponding adjustment to be made by the mobile device to the estimated location of one of the resource tags.

11. The method of claim 1, further comprising providing the estimated locations of the resource tags to a computing device.

12. The method of claim 11, further comprising:
   providing distancing rules to the computing device; and
   providing to an operator by the computing device of recommended assignments of the shared resources to the persons for use by the persons within the facility.

13. The method of claim 11, wherein the method further comprises:
   providing distancing rules to the computing device; and
   assigning by the computing device of the shared resources to the persons for use by the persons within the facility.

14. The method of claim 1, wherein the assigning of the shared resources to the persons includes assigning one of the shared resources to one of the persons as the person enters the facility, and releasing said shared resource from assignment to said one of the person as the person leaves the facility.

15. The method of claim 1, further comprising dividing the persons into a plurality of sub-groups, and wherein assigning the shared resources to the persons includes assigning the shared resources such that use of the same shared resource by members of more than one of the sub-groups is minimized or eliminated.

16. The method of claim 1, further comprising maintaining a log of said assigning of the shared resources to the persons.

17. The method of claim 16, further comprising, upon discovering that a first of the persons was previously within the facility while infected with a pathogen, analyzing the log to identify a second of the persons who is at heightened risk of cross contamination by the pathogen, and applying at least one mitigating action to the second person.

18. The method of claim 17, wherein the at least one mitigating action includes applying a test to the second person to determine if the second person has become infected with the pathogen.

19. The method of claim 17, wherein identifying the second person includes determining that identical or proximal shared resources were assigned to the first and second persons at the same time, or at times that were closely spaced apart.

20. The method of claim 17 wherein identifying the second person includes determining a pattern of air currents proximal to one or more resources within the facility that were simultaneously assigned to the first and second persons.

21. A method of assigning resources to persons within a facility, the method comprising:
identifying a plurality of shared resources within the facility;
locating a plurality of resource tags within the facility, each of the shared resources being associated with, and proximal to, at least one of the resource tags;
providing a mobile device that is able to sense the resource tags, said mobile device, upon sensing any one of the resource tags, being able to automatically approximate a location of the resource tag within the facility;
while the mobile device is within the facility, causing the mobile device to sense each of the resource tags, and to determine an estimated location for each of the resource tags;
providing the estimated locations of the resource tags to an augmented reality device;
causing the augmented reality device to present the estimated locations of the resource tags to a user by superimposing the estimated locations of the resource tags onto a field of view of the user as the user is observing the resource tags within the facility;
adjusting by the user of the estimated locations of the resource tags to obtain adjusted resource tag locations that accurately correspond with actual locations of the resource tags within the facility;
presenting by the augmented reality device of the adjusted resource tag locations to the user by superimposing the adjusted locations of the resource tags onto the field of view of the user as the user is observing the resource tags within the facility; and
according to the adjusted resource tag locations, assigning the shared resources to the persons for use by the persons within the facility, said assigning being configured to enhance distancing between the persons while they are within the facility.

\* \* \* \* \*